No. 802,695. PATENTED OCT. 24, 1905.
H. INGHAM, M. ROBINSON & J. W. INGHAM.
BICYCLE.
APPLICATION FILED AUG. 8, 1904.
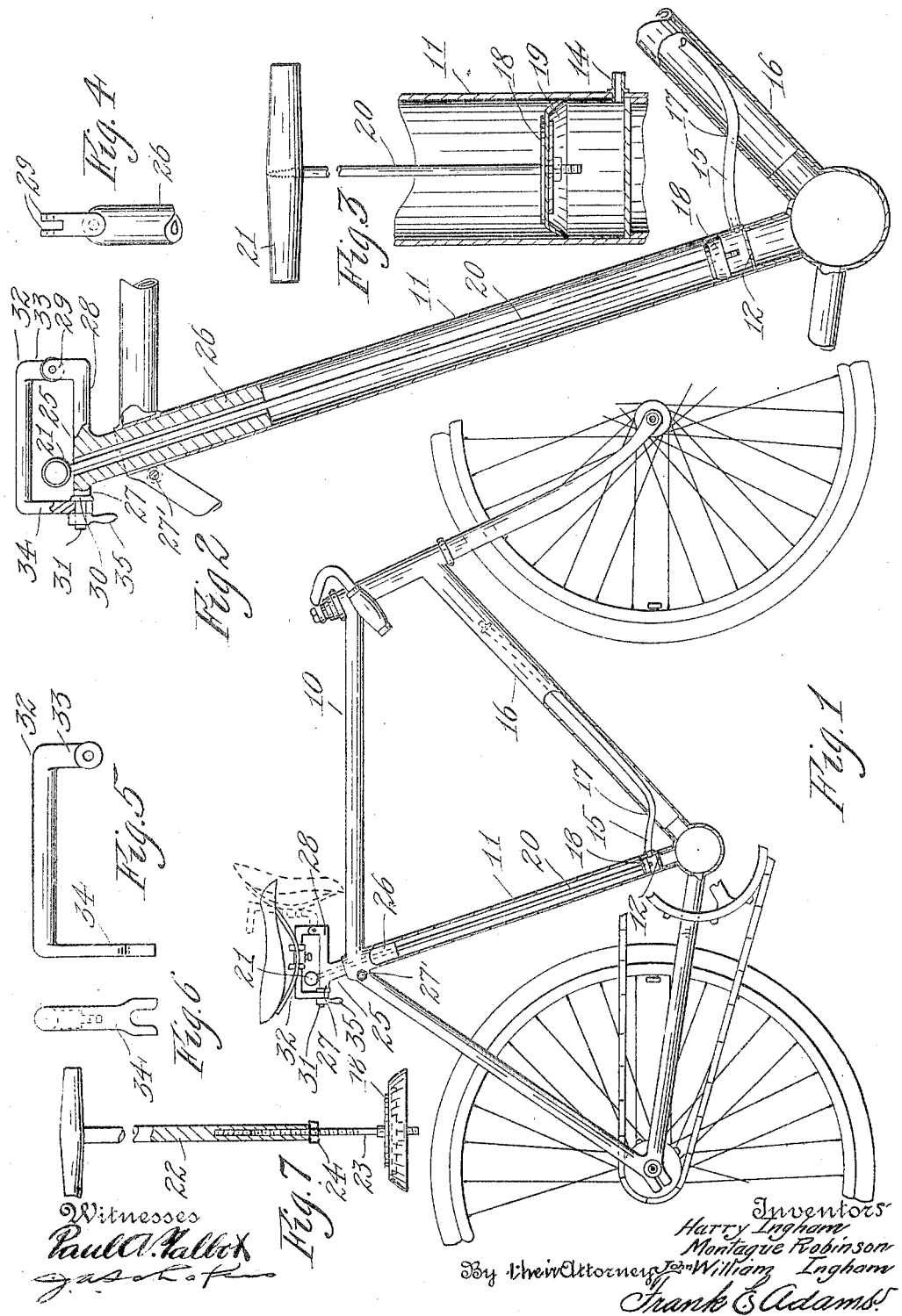
Witnesses
Paul A. Talbot
Inventors
Harry Ingham
Montague Robinson
John William Ingham
By their Attorney
Frank E. Adams

UNITED STATES PATENT OFFICE.

HARRY INGHAM, MONTAGUE ROBINSON, AND JOHN WILLIAM INGHAM, OF ROCHE HARBOR, WASHINGTON.

BICYCLE.

No. 802,695.    Specification of Letters Patent.    Patented Oct. 24, 1905.

Application filed August 8, 1904. Serial No. 220,019.

*To all whom it may concern:*

Be it known that we, HARRY INGHAM and MONTAGUE ROBINSON, citizens of the United States, and JOHN WILLIAM INGHAM, a subject of the King of Great Britain, all residents of Roche Harbor, in the county of San Juan and State of Washington, have invented certain new and useful Improvements in Bicycles, of which the following is a specification.

Our invention relates to improvements in bicycles, and has special reference to a combined main frame and tire-inflating apparatus.

The object of our invention is to embody a pump-barrel as a structural member of the main frame of the bicycle, so that tire-inflating apparatus, which shall be constantly with the machine, can be readily and cheaply combined therewith without requiring alteration in the general design of an ordinary frame.

Further objects of the invention are to so arrange the apparatus that it will be readily accessible and easy to operate and to provide for the ready storage of the hose employed.

The above-mentioned and other desirable objects are attained by the construction, combination, and arrangement of parts as disclosed on the accompanying drawings, set forth in the following specification, and pointed out in the appended claims.

With reference to the drawings filed herewith and bearing like reference characters for corresponding parts throughout, Figure 1 is a view in side elevation of a bicycle embodying our invention and shown with portions of some of the parts broken away and other of the parts in section. Fig. 2 is a fragmentary sectional view, on large scale, of portions of the main frame and seat-post and shows the piston and means for operating the same and a portion of the hose. Fig. 3 is a diametrical sectional view, on large scale, of the lower end portion of the pump-barrel and shows the piston in like section and the rod attached. Fig. 4 is a fragmentary view of the seat-post. Fig. 5 is a side view of the seat-support. Fig. 6 is an end view of said support, and Fig. 7 is a longitudinal sectional view of a piston-rod of modified form.

In manufacturing a bicycle embodying our invention we construct the main frame, as 10, after the general design of the frame of an ordinary vehicle of this nature and include therein a pump-barrel 11 as one of the structural members of the frame, preferably placing same in the position of the seat-mast. This barrel consists of a section of steel tubing, such as employed as seat-masts in ordinary bicycle-frame structure and which is reamed out or otherwise rendered smooth on the inner surface and conveniently provided adjacent the lower end with a suitable head, as 12, and a discharge-orifice thereabove, in which a nipple 14 is fitted for the connection of a section of hose 15, which is of suitable length to reach to the valve of either tire of the vehicle and is provided with the usual screw-coupling at the free end for connecting same with said valves. To conveniently provide for the storage of the hose 15 when not in use, an aperture is formed in the lower head-frame tube 16, adjacent the lower end thereof at a point, as 17, which aperture is of suitable size to receive the hose freely, whereby it can be inserted in the said tube for storage.

With the exception of the modifications heretofore noted in the seat-mast and lower head-frame tube the main frame 10 is of any ordinary or desired construction, and the parts thereof are assembled and connected in any well-known manner, the barrel 11 and tube 16 being connected with the crank-hanger bracket, with the discharge-orifice of the former lying opposite to the aperture in the latter, so that the hose can be readily inserted in the tube 16 without disconnection from the nipple 14.

Fitting within the pump-barrel 11 is a piston 18 of ordinary construction, embracing a cupped leather packing 19, which acts to allow air to pass beneath the piston as it is drawn upwardly and confines the air beneath the piston for discharge when the piston is forced downwardly. Attached to this piston is a rod 20, which is of suitable length to project above the upper end of the pump-barrel when the piston is at the lower end of its travel, and connected with this rod is a suitable handle, as 21. If desired, the piston-rod is made extensible, as disclosed in Fig. 7, so that compensation can be made for the adjustment of the seat-post, the rod being made of two sections, as 22 and 23, the former of which has the handle attached and is formed with a screw-threaded hole in the lower-end portion and the latter having the piston attached and formed with a screw-threaded stem, which fits in said hole and carries a lock-nut 24, which is screwed against the end of section 22 to fasten said sections together in adjusted positions.

The seat-post, as 25, is formed with a tubular stem, as 26, of suitable exterior diameter to slidably fit in the upper end of the pump-barrel 11 and of suitable diameter of bore to receive freely the piston-rod, whereby the said stem serves as a guide for said rod, and formed integral with this stem are opposite laterally-projecting horizontal bracket parts 27 and 28, the former of which is provided with upwardly-projecting opposite pintle-lugs 29 at the outer end and the latter formed with a shoulder 30 and an outwardly-extending screw-threaded stud 31. Swingingly connected with the seat-post is a seat-support 32, consisting of a bar to which the seat proper is fastened and which is provided at one end with a laterally-projecting pintle-lug 33, fitting between the lugs 29 of the seat-post and connected therewith by a suitable pintle and at the opposite end having a downwardly-extending lug 34, provided with a notch at the lower end adapted to receive the stud 31 of the seat-post freely. Engaged with this stud is a hand-nut 35, which is adapted to bind the lug 34 against the shoulder 30, and thereby secure the support in place on the seat-post and which can be loosened to permit said support to be swung to the position indicated by broken lines in Fig. 1 when desired to operate the piston of the pump.

The seat is conveniently adjustably secured in position in the pump-barrel by providing an elongated notch in the upper end portion of said barrel between the rear stays of the main frame and arranging a binding-bolt, as 27', in suitable apertures provided at the upper ends of said stays, as in the ordinary and well-known manner of providing for the clamping of the seat-post in the seat-mast.

By providing a pump-barrel in the position indicated it not only serves as a structural member of the main frame, but renders it easy for the operator to hold the vehicle from moving during the operation of the piston. Furthermore, by combining the pump-barrel as a structural member of the main frame it is made to serve a double purpose, and the necessity of providing a pump separate and apart from the frame is obviated and the danger of its misplacement or loss avoided.

The adjustment of the parts and operation of tire-inflating apparatus will be readily understood, as when desired to inflate the tire it is simply necessary to withdraw the hose from tube 16 and connect same with the tire-valve as is the ordinary manner when the seat is swung to the position shown by broken lines in Fig 1 and the piston then operated by grasping the handle 21.

The invention can be readily incorporated with the vehicle at the time of its manufacture, or, if desired, vehicles of the type set forth which are already built can be modified in accordance therewith by reaming out or otherwise smoothing the inner surface of the seat-mast, placing a suitable head therein adjacent the lower end and providing the discharge-orifice in said mast so as to form a pump-barrel, and providing the aperture for the hose in the lower head-frame tube. Then a nipple 14 can be fitted to said orifice, a piston 18 with rod attached placed in the modified seat-mast, and a seat-post and seat-support such as heretofore described furnished.

Having thus described our invention, what we claim as new, and desire to secure by Letters Patent, is—

1. In a bicycle, a tube included in the main frame as the seat-mast and having a discharge-orifice, in combination with a hollow seat-post mounted in the upper end of said tube, a piston in said tube, a rod attached to said piston and projecting through said seat-post, forwardly and rearwardly projecting bracket-arms secured to the upper end of said seat-post, a seat-support pivoted to the forwardly-projecting arm, means for securing the free end of said support to the rearwardly-projecting arm, and a handle on said stem arranged between the upper end of said seat-post and said seat-support.

2. In a bicycle, a tube included in the main frame as the seat-mast and having a discharge-orifice, in combination with a hollow seat-post mounted in the upper end of said tube, a piston in said tube, a rod attached to said piston and projecting through said seat-post, forwardly and rearwardly projecting bracket-arms secured to the upper end of said seat-post, upwardly-projecting pintle-lugs secured to the forwardly-projecting arm, a seat-support pivoted to the lugs of the forwardly-projecting arm, a stud carried by the rearwardly-projecting arm, said seat-support having on its rear end a depending bifurcated lug adapted to straddle said stud, means for securing said lug on said stud, and a handle on said stem arranged between the upper end of said seat-post and said seat-support.

Signed at Roche Harbor, Washington.

HARRY INGHAM.
MONTAGUE ROBINSON.
JOHN WILLIAM INGHAM.

Witnesses:
V. J. CAPRON,
L. M. HARPER.